US012573807B2

(12) United States Patent
Yang et al.

(10) Patent No.: US 12,573,807 B2
(45) Date of Patent: Mar. 10, 2026

(54) SIDEBAND RAMAN LIGHT FOR COLD ATOM INTERFEROMETER THROUGH PHASE MODULATION

(71) Applicant: NATIONAL UNIVERSITY OF DEFENSE TECHNOLOGY, Changsha (CN)

(72) Inventors: Jun Yang, Changsha (CN); Guochao Wang, Changsha (CN); Lingxiao Zhu, Changsha (CN); Shuhua Yan, Changsha (CN); Xiye Guo, Changsha (CN); Yaning Wang, Changsha (CN); Aiai Jia, Changsha (CN); Mengjie Lv, Changsha (CN); Dongyang Xu, Changsha (CN); Xu Zhang, Changsha (CN); Huankai Zhang, Changsha (CN); Xiao Yu, Changsha (CN)

(73) Assignee: NATIONAL UNIVERSITY OF DEFENSE TECHNOLOGY, Changsha (CN)

( * ) Notice: Subject to any disclaimer, the term of this patent is extended or adjusted under 35 U.S.C. 154(b) by 611 days.

(21) Appl. No.: 18/020,949

(22) PCT Filed: Nov. 24, 2020

(86) PCT No.: PCT/CN2020/131093
§ 371 (c)(1),
(2) Date: Feb. 13, 2023

(87) PCT Pub. No.: WO2022/032928
PCT Pub. Date: Feb. 17, 2022

(65) Prior Publication Data
US 2023/0299553 A1 Sep. 21, 2023

(30) Foreign Application Priority Data
Aug. 13, 2020 (CN) .......................... 202010810318.1

(51) Int. Cl.
*H01S 3/10* (2006.01)
*G01C 19/66* (2006.01)
(Continued)

(52) U.S. Cl.
CPC ............ *H01S 3/302* (2013.01); *G01C 19/661* (2013.01); *H01S 3/0085* (2013.01); *H01S 3/0092* (2013.01)

(58) Field of Classification Search
CPC ...... H01S 3/302; H01S 3/0085; H01S 3/0092; H01S 3/10007; H01S 3/1086; H01S 3/109
See application file for complete search history.

(56) References Cited

U.S. PATENT DOCUMENTS

2017/0372808 A1 12/2017 Gill et al.

FOREIGN PATENT DOCUMENTS

CN 105066991 A 11/2015
CN 107727122 A 2/2018
(Continued)

*Primary Examiner* — Kinam Park
(74) *Attorney, Agent, or Firm* — Bayramoglu Law Offices LLC

(57) ABSTRACT

A method and a system for generating single-sideband Raman light for cold atom interferometer through phase modulation are provided. The system includes a laser, an electro-optic modulator (EOM), a local microwave oscillator, a narrow-bandwidth optical-fiber filter, an optical-fiber power amplifier and a frequency doubling crystal. The laser has frequency of $\omega$ and is input to the EOM. The local microwave oscillator applies a modulation voltage with frequency of $\delta$ to the EOM and generate double-sideband frequency-modulated light with frequencies of $\omega \pm n\delta (n=0, 1,2, \ldots )$. This light is filtered by the narrow-bandwidth optical-fiber filter, which outputs the target frequency light and is successively input to the optical-fiber power amplifier and the frequency doubling crystal and yields the single- (Continued)

sideband Raman light for cold atom interferometer. The Raman light generation system has simple structure, low-cost, high integration level, easy implementation, high maturity and good stability, and has practical significance in realizing an engineering-based laser system for high-precision atom interferometer measurement.

18 Claims, 2 Drawing Sheets

(51) Int. Cl.
H01S 3/00       (2006.01)
H01S 3/30       (2006.01)

(56) References Cited

FOREIGN PATENT DOCUMENTS

| | | |
|---|---|---|
| CN | 107959222 A | 4/2018 |
| CN | 108225578 A | 6/2018 |
| CN | 109066274 A | 12/2018 |
| CN | 110718853 A | 1/2020 |

SIDEBAND RAMAN LIGHT FOR COLD ATOM INTERFEROMETER THROUGH PHASE MODULATION

CROSS-REFERENCE TO THE RELATED APPLICATIONS

This application is the national phase entry of International Application No. PCT/CN2020/131093, filed on Nov. 24, 2020, which is based upon and claims priority to Chinese Patent Application No. 202010810318.1, filed on Aug. 13, 2020, the entire contents of which are incorporated herein by reference.

TECHNICAL FIELD

The present disclosure relates to a method and a system for generating single-sideband Raman light for cold atom interferometer through phase modulation.

BACKGROUND

Based on the interference characteristics of atomic matter wave, an atom interferometer can be constructed for precise measurement of physical quantities. Atom interferometer has extremely high measurement accuracy and sensitivity and has better coherence in space and velocity distributions. At present, —atom interferometer has been widely used in high-precision measurements of rotational angular velocity, gravitational acceleration, and gravity gradient, as well as research of fundamental physics such as fine structure constant, the equivalent principle, gravitational waves, and the general relativity.

In a cold atom interferometer system based on a two-photon stimulated Raman transition, it is necessary to use prepared Raman light pulses to perform interference operations for splitting, re-direction, and re-combination of an atomic wavepacket. The performance of the Raman light directly determines the measurement precision and sensitivity of the atom interferometer, as well as the reliability and integration level. At present, a 780 nm laser is generally used directly as a seed light source for generating various kinds of manipulation light required by rubidium atom interferometer. However, optical devices at the 780 nm band are under-developed, and the devices are expensive and easily damaged due to low energy threshold. Therefore, a 1560 nm laser is used as the seed light source. As the 1560 nm band belongs to the communication band, the corresponding devices have advantages of high technical maturity, low price, and high integration level. At present, there are three main methods for generating Raman light, namely, the optical phase-locking synthesis method, the optical frequency-shifting synthesis method, and the electro-optic phase modulation method. Based on the optical coherent phase-locking technology, the optical phase-locking synthesis method locks the beat frequency between the master and the slave lasers and then synthesizes master and slave lasers spatially to obtain two beams of coherent Raman light with a fixed frequency difference. The optical frequency-shifting synthesis method performs frequency shifting on the fundamental frequency laser for multiple times by using an acousto-optic frequency shifter and then performs spatial beam synthesis on the frequency-shifted laser and the original beam to obtain the Raman light. The electro-optic phase modulation method uses a laser to generate the $0^{th}$-order and the sideband-mixed coherent light with an equal frequency interval, same polarization, and adjustable light intensity by using an electro-optic phase modulator and uses the $0^{th}$-order and the +1-order sideband as the Raman light, thus meeting requirements of high coherence and low phase noise of the Raman light. Compared with the former two methods, the electro-optic phase modulation method has the advantages of a simple system structure, easy integration, high technical maturity, an all-fiber structure, and high efficiency. In addition, the Raman light generated by the electro-optic phase modulation method is characterized as uniform polarization, optical coherence, and naturally low noise. Therefore, the electro-optic phase modulation method is a Raman light generation method with the largest engineering practical value to date. However, the present electro-optic phase modulation method also has defects and deficiencies, which are manifested in that double sidebands are generated on the left and right sides of the fundamental frequency light in ordinary electro-optic phase modulation, resulting in a Raman sideband effect. This will affect the contrast of an atom interferometer fringe and cause a phase measurement error. Although an equivalent single-sideband modulation method based on the IQ modulation principle has been recently proposed, it only resolves the problem of bidirectional modulation. There may still be other sideband effects, and the sideband suppression performance needs to be further improved. Moreover, the IQ modulator has a high cost, poor stability, and a complex system, and it is difficult to achieve long-term stability control and meet the requirements of high-precision and high-stability in practical engineering applications.

At present, to eliminate the sideband effect of the electro-optic phase modulation method, researchers have proposed some methods, including the optical resonator filtering method, the calcite crystal-based polarization modulation method, etc., but all these methods have some limitations. The optical resonator filtering method uses an F-P cavity to filter the electro-optic modulated laser. The free spectrum range of the F-P cavity is set to filter the carrier, and the first-order sidebands are used as a pair of Raman light. However, this method has a complex structure and cannot be integrated into an optical-fiber device, and the ±1-order sidebands have the same light intensity. As a result, with this method the power ratio of the Raman light cannot be adjusted, therefore it is difficult to apply this method to an atom interferometer experiment. The calcite crystal-based polarization modulation method injects the output light of a phase modulator into a calcite crystal and makes the light pass through the crystal for multiple times through reflection, such that the carrier and sidebands have different polarization changes, that is, the −1-order sideband has vertical linear polarization, the +1-order sideband has horizontal linear polarization, and the carrier has circular polarization. Only the carrier and the +1-order sideband are left after the light beam passes through a horizontal polarizer. This method has high requirements for light collimation and alignment, requiring the light to pass through the calcite crystals for multiple times. This method also has a complex structure, a high requirement for environmental conditions, and low coupling efficiency.

Therefore, based on the technical realization of the electro-optic phase modulation method for Raman laser generation, it is of vital significance for the Rb atom interferometer quantum precision measurement to have a integrated, low-cost, simple and effective new method for single sideband Raman laser generation.

SUMMARY

Various embodiments provided according to the present disclosure provide a method and a system for generating single-sideband Raman light for cold atom interferometer through phase modulation.

A system for generating single-sideband Raman light for cold atom interferometer through phase modulation includes a laser source, an electro-optic modulator (EOM), a local microwave oscillator, a narrow-bandwidth optical-fiber filter, an optical-fiber power amplifier, and a frequency doubling crystal. The laser source generates laser with a frequency of $\omega$, and the laser is input to the EOM. The local microwave oscillator applies a modulation voltage with a frequency of $\delta$ to the EOM, and the EOM outputs double-sideband frequency-modulated light with a frequency of $\omega\pm n\delta$, where n=0,1,2, .... The double-sideband frequency-modulated light is input to the narrow-bandwidth optical-fiber filter, which is matched with the target frequency light. The narrow-bandwidth optical-fiber filter outputs the target frequency laser, and single-sideband Raman light is output after the target frequency laser being successively input to the optical-fiber power amplifier and the frequency doubling crystal.

A method for generating single-sideband Raman light for cold atom interferometer through phase modulation includes the following processes:

a Raman sideband generation process: the laser source generates laser with a frequency of $\omega$, and the laser is input to the EOM; the local microwave oscillator applies a modulation voltage with a frequency of $\delta$ to the EOM, and the EOM outputs double-sideband frequency-modulated light with a frequency of $\omega\pm n\delta$, where n=0,1,2, ... ;

an excess sideband filtering process: injecting the double-sideband frequency-modulated light output by the EOM into the narrow-bandwidth optical-fiber filter, which is matched with the target frequency light to filter the excess sidebands except for the matched target frequency light, and yielding the target frequency laser; and a frequency doubling process: performing power amplification on the target frequency laser by using the optical-fiber power amplifier, and then performing frequency doubling by using the frequency doubling crystal, where the light output after the frequency doubling is the single-sideband Raman light.

Details of one or more embodiments of the present application will be illustrated in the following accompanying drawings and descriptions. Other features and advantages of the present disclosure become evident in the specification, claims, and accompanying drawings.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and those of ordinary skill in the art may still derive other accompanying drawings from these accompanying drawings without creative efforts.

DETAILED DESCRIPTION OF THE EMBODIMENTS

Embodiments of the present disclosure are described in detail below with reference to the accompanying drawings, but the present disclosure can be implemented in a variety of different modes as limited by the claims.

The principle of generating Raman light is as follows:

Time-varying electric field intensity E(t) of the laser output from a laser source can be expressed as $E(t)=Ee^{i\omega t}$, where E represents the amplitude of the electric field intensity and $\omega$ represents the laser frequency. The laser is input to an electro-optic phase modulator, and a modulation signal with a frequency of $\delta$ is applied to the EOM. The corresponding modulation frequency of the EOM is $\delta$, and the modulation depth is $\beta$. Based on the first-order electro-optic effect of a nonlinear crystal, the frequency-modulated light after modulation can be expressed as follows:

$$E(t) =$$
$$E_0 e^{i(\omega t + \beta \sin \delta t)} = E_0 \left[ J_0(\beta) e^{i(\omega t - \varphi)} + \sum_{n=1}^{+\infty} \left( J_n(\beta) e^{i((\omega + n\delta)t - \varphi)} - J_n(\beta) e^{i((\omega - n\delta)t - \varphi)} \right) \right].$$

In the above formula, $E_0$ represents the amplitude of the electric field intensity after passing through the electro-optic phase modulator, $J_0(\beta)$ represents the $0^{th}$-order Bessel function, $J_n(\beta)$ represents the nth-order Bessel function, $\varphi$ represents the phase shift after passing through the EOM, and t represents time.

Figure 1:
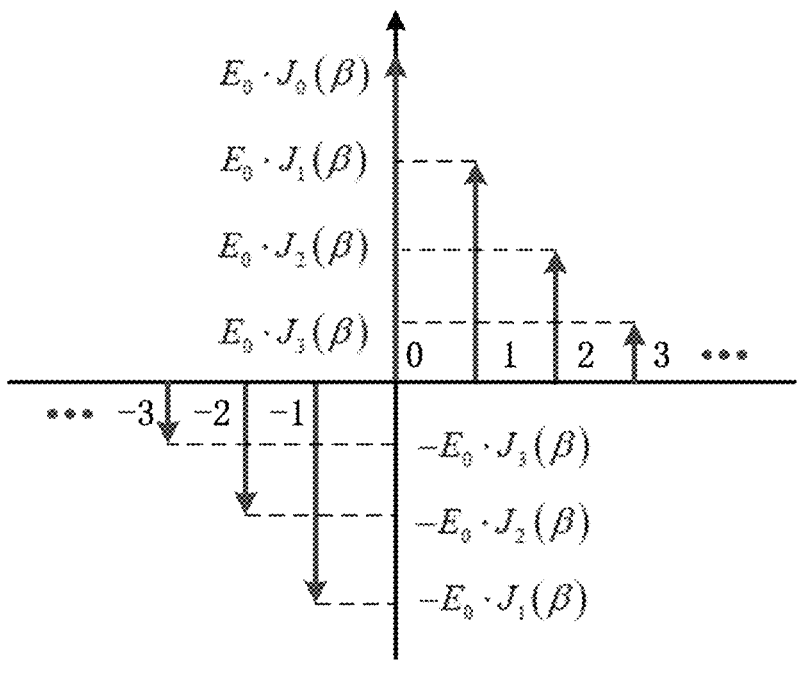
FIG. 1 is a frequency domain model of the electro-optic phase-modulated light according to one or more embodiments.

FIG. 1 shows the frequency domain model of the electro-optic phase-modulated light. A series of light with frequencies of $\omega\pm n\delta$ (n=0,1,2, ... ) and amplitudes of $E_0 \cdot J_n(\beta)$ can be output by the EOM. The generation of the Raman light only requires the carrier (with a frequency of $\omega$) and the +1-order sideband (with a frequency of $\omega+\delta$) of the frequency-modulated light, while excess Raman laser sidebands cause Raman transitions of the atom, thus resulting in the Raman sideband effect, which has a major impact on the absolute accuracy of a cold atom gravimeter. Therefore, it is necessary to inject the frequency-modulated light output by the EOM into a narrow-bandwidth optical-fiber filter for optical filtering.

Figure 2:
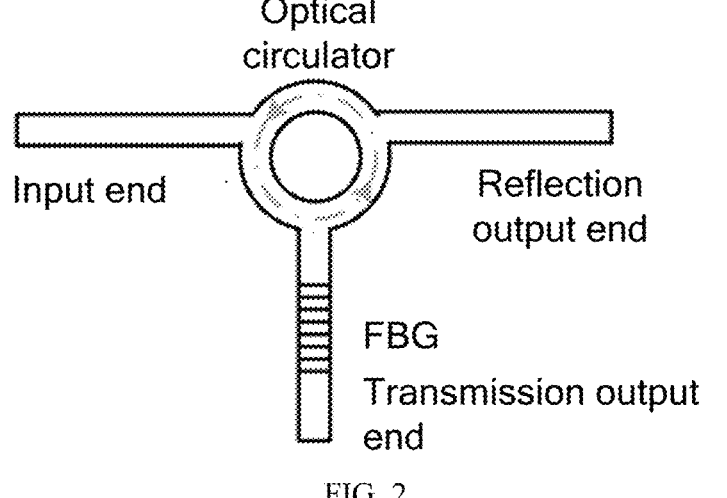
FIG. 2 is a schematic diagram of the structure of a narrow-bandwidth optical-fiber filter according to one or more embodiments.

As an important device in the present disclosure, the narrow-bandwidth optical-fiber filter is an optical grating, which has a periodic spatial phase distribution in a fiber core. It is essentially used to form a narrow-band (transmission or reflection) filter or reflector in the fiber core. A structure of the narrow-bandwidth optical-fiber filter is shown in FIG. 2. The narrow-bandwidth optical-fiber filter structurally includes an optical circulator, an optical grating, an input end, a reflection output end, and a transmission output end. The optical circulator is connected to the input end, the transmission output end, and the reflection output end, respectively, and the optical grating is positioned between the optical circulator and the transmission output end. The optical circulator is a multi-port non-reciprocal optical device, and the incident light can only propagate in one direction in the optical circulator. The optical circulator includes an input port, a reflection output port, and a transmission output port, and the transmission output port is connected to the transmission output end through the optical grating. The optical grating is a fiber Bragg grating (FBG). The optical grating includes numerous specific-wavelength reflection points. A target signal can be output by accurately matching the distance between two reflection points. Specifically, the double-sideband frequency-modulated light enters the optical circulator from the input port through the input end, a light wave signal that does not meet the Bragg condition is transmitted through the FBG and output from the transmission output end, and a light wave signal that meets the Bragg condition is reflected by the FBG and output from the reflection output port to obtain the target frequency laser. The main parameters of the narrow-band-width optical-fiber filter are the initial refractive index n, the light-induced perturbation in the refractive index $\Delta n$, the grating pitch $\Lambda$, and the grating length L.

Figure 3:
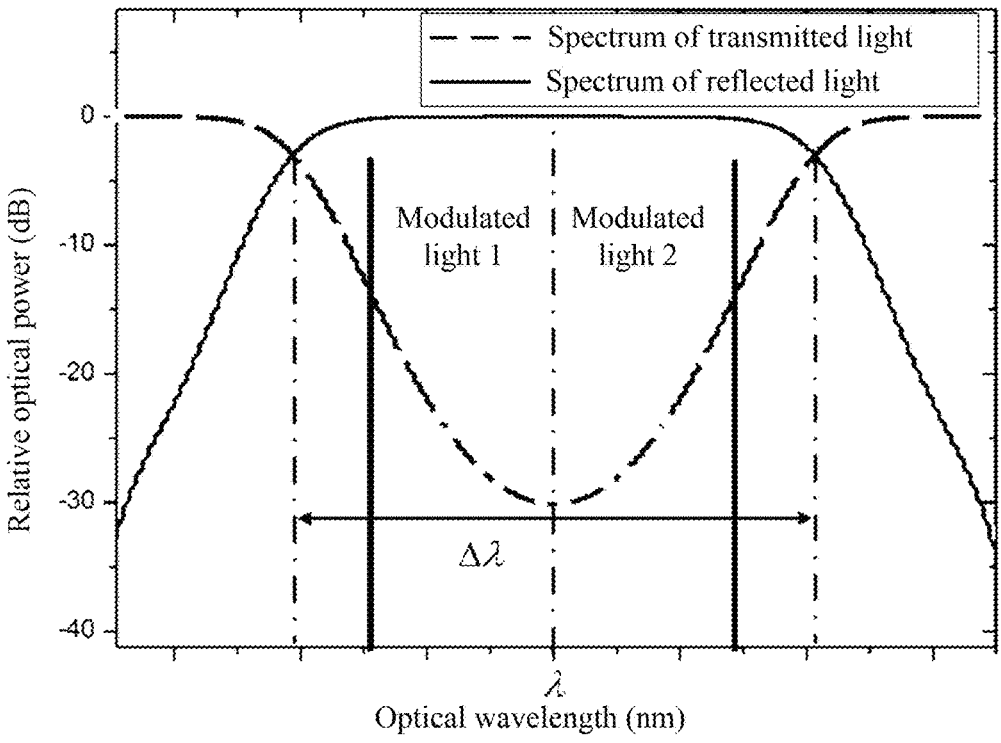
FIG. 3 is a schematic diagram of the spectrum of a narrow-bandwidth optical-fiber filter according to one or more embodiments.

FIG. 3 shows the transmission and reflection spectra of the narrow-bandwidth optical-fiber filter. The solid line in the figure represents the reflection spectrum of the narrow-bandwidth optical-fiber filter, and the dashed line represents the transmission spectrum of the narrow-bandwidth optical-fiber filter. It can be seen that a laser within the wavelength range of $$\lambda \pm \frac{1}{2}\Delta\lambda$$

is almost completely reflected after passing through the FBG, while at the remaining wavelength, the laser is basically not reflected, whereas $\lambda$ represents the reflection center wavelength of the FBG, and $\Delta\lambda$ represents the full width at half maximum of the reflection curve, or the curve bandwidth corresponding to 3 dB loss. As shown in FIG. 3, an appropriate design of the center wavelength and the reflection spectrum bandwidth may ensure that the $0^{th}$-order sideband and the +1-order sideband in the EOM, namely, Raman 1 and Raman 2, locate at the center of the reflection spectrum while the other sidebands are filtered.

The reflection center wavelength $\lambda$ of the FBG is determined by the grating pitch $\Lambda$, and the relationship between the reflection center wavelength and the grating pitch is as follows:

$$\lambda = 2n\Lambda$$

The relationship between the full width at half maximum $\Delta\lambda$ of the reflection spectrum, and the light-induced perturbation in the refractive index $\Delta n$ of the FGB, and the grating length L can be expressed as:

$$\Delta\lambda = \lambda\sqrt{\left(\frac{\Delta n}{2n}\right)^2 + \left(\frac{\Lambda}{L}\right)^2}$$

Parameters such as the initial refractive index n, the light-induced perturbation in the refractive index $\Delta n$, the grating pitch $\Lambda$, and the grating length L are designed to ensure that only the carrier and the +1-order sideband of the EOM are within the reflection spectrum bandwidth of the FBG and the other sidebands are filtered.

After passing through the narrow-bandwidth optical-fiber filter, a laser with frequencies of $\omega$, $\omega+\delta$ is obtained. At this time, the laser is input to an erbium-doped fiber amplifier (EDFA) for amplification, and then the amplified laser is frequency doubled by a periodically poled lithium niobate (PPLN) to obtain output light with frequencies of $2\omega$, $2\omega+\delta$, $2(\omega+\delta)$. A pair of lasers with frequencies of $2\omega$, $2\omega+\delta$ is single-sideband Raman light required in a cold atom interferometer process. Although sideband light with a frequency of $2\omega+2\delta$ and light with a frequency of $2\omega+\delta$ can also form a pair of parallel Raman light, due to large frequency detuning, the impacts of this pair of parallel Raman light can be basically eliminated by reasonably selecting optical parameters such as the intensity of the Raman pulse.

Figure 4:
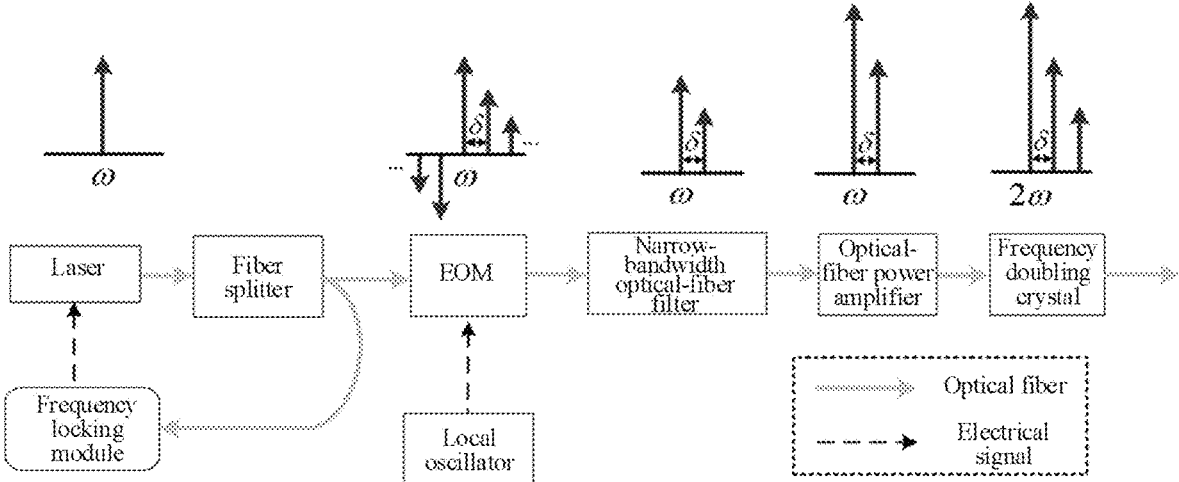
FIG. 4 shows a system for generating single-sideband Raman light for cold atom interferometer according to one or more embodiments.

As shown in FIG. 4, a system for generating single-sideband Raman light for cold atom interferometer through phase modulation includes a laser source, an EOM, a local microwave oscillator, a narrow-bandwidth optical-fiber filter, an optical-fiber power amplifier, and a frequency doubling crystal.

The laser source generates laser with a frequency of $\omega$, and the laser is input to the EOM. The local microwave oscillator applies a modulation voltage with a frequency of $\delta$ to the EOM, and the EOM outputs double-sideband frequency-modulated light with a frequency of $\omega\pm n\delta$, where $n=0,1,2, \dots$. The double-sideband frequency-modulated light is input to the narrow-bandwidth optical-fiber filter, which is matched with the target frequency light. The narrow-bandwidth optical-fiber filter outputs the target frequency laser, which is successively input to the optical-fiber power amplifier and the frequency doubling crystal and yields the single-sideband Raman light.

Specifically, the target frequency laser includes the carrier light with a frequency of $\omega$ and the +1-order sideband light with a frequency of $\omega+\delta$.

The single-sideband Raman light includes light with frequencies of $2\omega$ and $2\omega+\delta$.

In a specific embodiment, the laser source locks the frequency to an optical frequency reference with preset stability by using a frequency-locking module.

The narrow-bandwidth optical-fiber filter includes an optical circulator, an optical grating, an input end, a reflection output end, and a transmission output end. The optical circulator is connected to the input end, the reflection output end, and the transmission output end, respectively, and the optical grating is positioned between the optical circulator and the transmission output end.

The optical circulator is a multi-port non-reciprocal optical device, and the incident light can only propagate in one direction in the optical circulator. The optical circulator includes an input port, a reflection output port, and a transmission output port, and the transmission output port is connected to the transmission output end through the optical grating. The optical grating is an FBG. The optical grating includes numerous specific-wavelength reflection points. A target signal can be output by accurately matching the distance between two reflection points. Specifically, the double-sideband frequency-modulated light enters the optical circulator from the input port through the input end, a light wave signal that does not meet the Bragg condition is transmitted through the FBG and output from the transmission output end, and a light wave signal that meets the Bragg condition is reflected by the FBG and output from the reflection output port to obtain the target frequency laser.

A method for generating single-sideband Raman light by using the above system includes three steps, the Raman sideband generation process, the excess sideband filtering process and the frequency doubling process. Specifically, the laser source generates laser with a frequency of $\omega$, the laser is input to the EOM, the local microwave oscillator applies a modulation voltage with a frequency of $\delta$ to the EOM, and the EOM outputs double-sideband frequency-modulated light with a frequency of $\omega \pm n\delta(n=0,1,2, \ldots)$. The desired target frequency is the carrier light $\omega$ and the +1-order sideband light $\omega+\delta$. The double-sideband frequency-modulated light output by the EOM is input to the narrow-bandwidth optical-fiber filter, which is matched with the target frequency light to filter the excess sidebands except for the carrier light and the +1-order sideband light. At this time, the light output by the narrow-bandwidth optical-fiber filter is the target frequency laser. Power amplification is performed on the target frequency laser by using the optical-fiber power amplifier, and then frequency doubling is performed by using the frequency doubling crystal, where light after the frequency doubling is the single-sideband Raman light.

The present disclosure takes a rubidium cold atom interferometer as an example and uses a frequency-locked laser with an accurate wavelength of 1560.500 nm as the laser source. Since the desired Raman light frequency interval is 6.834 GHz, a sinusoidal wave signal with a frequency of 6.834 GHz (a corresponding wavelength of 55 pm) is applied to the electro-optic phase modulator to obtain a series of output light with a carrier wavelength of 1560.500 nm and a wavelength interval of 55 pm. The center wavelength and the bandwidth of the narrow-bandwidth optical-fiber filter are set to 1560.470 nm and 80 pm, respectively. After passing through the narrow-bandwidth optical-fiber filter, only the carrier and the +1-order sideband are left, corresponding to wavelengths of 1560.500 nm and 1560.445 nm, respectively. After frequency doubling, the target Raman light of 780.250 nm and 780.236 nm is output.

The method in the present disclosure ingeniously utilizes a characteristic that the narrow-bandwidth optical-fiber filter has different reflectivity for the light of different wavelengths and eliminates excess sidebands generated by the EOM. Compared with other methods for eliminating the sideband effect, this method can be coupled into an optical-fiber system, which is characterized by strong feasibility, a simple scheme, and high integration, reduces the implementation cost, and provides a practical and innovative ingenious solution for eliminating the sideband effect. In addition, by setting the appropriate center wavelength and bandwidth of the optical-fiber filter, a frequency hopping function can be realized to obtain the cooling light required for atom cooling. That is, the frequency of the cooling light obtained after a small frequency shift of the Raman light can still be within the reflection spectrum bandwidth of the optical-fiber filter. This can realize multiplexing of the optical path and improve the integration level of the laser system.

The above description describes merely preferred embodiments of the present disclosure and is not intended to limit the present disclosure, and various changes and modifications of the present disclosure may be made by those skilled in the art. Any modifications, equivalent substitutions, improvements, and the like made within the spirit and principle of the present disclosure should be included within the protection scope of the present disclosure.

What is claimed is:

1. A system for generating a single-sideband Raman light for cold atom interferometer through phase modulation, comprising a laser source, an electro-optic modulator (EOM), a local microwave oscillator, a narrow-bandwidth optical-fiber filter, an optical-fiber power amplifier, and a frequency doubling crystal, wherein the laser source generates laser with a frequency of $@$, and the laser is input to the EOM;

the local microwave oscillator applies a modulation voltage with a frequency of $\delta$ to the EOM, and the EOM outputs double-sideband frequency-modulated light with a frequency of $\omega \pm n\delta$, wherein $n=0,1,2, \ldots$; the double-sideband frequency-modulated light is input to the narrow-bandwidth optical-fiber filter, which is matched with the target frequency light; the narrow-bandwidth optical-fiber filter outputs the target frequency laser, which is successively input to the optical-fiber power amplifier and the frequency doubling crystal and yields the single-sideband Raman light.

2. The system for generating the single-sideband Raman light for cold atom interferometer through phase modulation according to claim 1, wherein the laser source locks the frequency to an optical frequency reference with preset stability by using a frequency-locking module.

3. The system for generating the single-sideband Raman light for cold atom interferometer through phase modulation according to claim 1, wherein the narrow-bandwidth optical-fiber filter comprises an optical circulator, an optical grating, an input end, a reflection output end, and a transmission output end, wherein the optical circulator is connected to the input end, the reflection output end, and the transmission output end, respectively, and the optical grating is positioned between the optical circulator and the transmission output end.

4. The system for generating the single-sideband Raman light for cold atom interferometer through phase modulation according to claim 3, wherein the optical circulator is a multi-port non-reciprocal optical device, and the incident light is configured to only propagate in one direction in the optical circulator.

5. The system for generating the single-sideband Raman light for cold atom interferometer through phase modulation according to claim 3, wherein the optical grating is a fiber Bragg grating (FBG).

6. The system for generating the single-sideband Raman light for cold atom interferometer through phase modulation according to claim 5, wherein the double-sideband frequency-modulated light enters the optical circulator through the input end, a first light wave signal is transmitted through the FBG and output from the transmission output end, and a second light wave signal is reflected by the FBG and output from the reflection output end to obtain the target frequency laser, wherein the first light wave signal does not meet a Bragg condition, and the second light wave signal meets the Bragg condition.

7. A method for generating a single-sideband Raman light for cold atom interferometer through phase modulation, wherein a system for generating the single-sideband Raman light for cold atom interferometer through phase modulation comprises a laser source, an EOM, a local microwave oscillator, a narrow-bandwidth optical-fiber filter, an optical-fiber power amplifier, and a frequency doubling crystal; and the method comprises:

a Raman sideband generation process: the laser source generates laser with a frequency of $\omega$, and the laser is input to the EOM; the local microwave oscillator applies a modulation voltage with a frequency of $\delta$ to the EOM, and the EOM outputs double-sideband frequency-modulated light with a frequency of $\omega \pm n\delta$, wherein $n=0,1,2, \ldots$;

an excess sideband filtering process: injecting the double-sideband frequency-modulated light output by the EOM into the narrow-bandwidth optical-fiber filter, which is matched with the target frequency light to filter the excess sidebands except for the matched target frequency light, and yielding the target frequency laser; and a frequency doubling process: performing a power amplification on the target frequency laser by using the optical-fiber power amplifier, and then performing a frequency doubling by using the frequency doubling crystal, wherein the light output after the frequency doubling is the single-sideband Raman light.

8. The method according to claim 7, wherein the laser source locks the frequency to an optical frequency reference with preset stability by using a frequency-locking module.

9. The method according to claim 7, wherein the narrow-bandwidth optical-fiber filter comprises an optical circulator, an optical grating, an input end, a reflection output end, and a transmission output end, wherein the optical circulator is connected to the input end, the reflection output end, and the transmission output end, respectively, and the optical grating is positioned between the optical circulator and the transmission output end.

10. The method according to claim 9, wherein the optical circulator is a multi-port non-reciprocal optical device, and the incident light is configured to only propagate in one direction in the optical circulator.

11. The method according to claim 9, wherein the optical grating is an FBG.

12. The method according to claim 11, wherein the double-sideband frequency-modulated light enters the optical circulator through the input end, a first light wave signal is transmitted through the FBG and output from the transmission output end, and a second light wave signal is reflected by the FBG and output from the reflection output end to obtain the target frequency laser, wherein the first light wave signal does not meet a Bragg condition, and the second light wave signal meets the Bragg condition.

13. A cold atom interferometer, employing Raman light generated by a system for generating a single-sideband Raman light for cold atom interferometer through phase modulation; and the system for generating the single-sideband Raman light for cold atom interferometer through phase modulation comprises a laser source, an EOM, a local microwave oscillator, a narrow-bandwidth optical-fiber filter, an optical-fiber power amplifier, and a frequency doubling crystal, wherein the laser source generates laser with a frequency of $\omega$, and the laser is input to the EOM; the local microwave oscillator applies a modulation voltage with a frequency of $\delta$ to the EOM, and the EOM outputs double-sideband frequency-modulated light with a frequency of $\omega \pm n\delta$, wherein $n=0,1,2, \ldots$; the double-sideband frequency-modulated light is input to the narrow-bandwidth optical-fiber filter, which is matched with the target frequency light; the narrow-bandwidth optical-fiber filter outputs the target frequency laser, which is successively input to the optical-fiber power amplifier and the frequency doubling crystal and yields the single-sideband Raman light.

14. The cold atom interferometer according to claim 13, wherein the laser source locks the frequency to an optical frequency reference with preset stability by using a frequency-locking module.

15. The cold atom interferometer according to claim 13, wherein the narrow-bandwidth optical-fiber filter comprises an optical circulator, an optical grating, an input end, a reflection output end, and a transmission output end, wherein the optical circulator is connected to the input end, the reflection output end, and the transmission output end, respectively, and the optical grating is positioned between the optical circulator and the transmission output end.

16. The cold atom interferometer according to claim 15, wherein the optical circulator is a multi-port non-reciprocal optical device, and the incident light is configured to only propagate in one direction in the optical circulator.

17. The cold atom interferometer according to claim 15, wherein the optical grating is an FBG.

18. The cold atom interferometer according to claim 17, wherein the double-sideband frequency-modulated light enters the optical circulator through the input end, a first light wave signal is transmitted through the FBG and output from the transmission output end, and a second light wave signal is reflected by the FBG and output from the reflection output end to obtain the target frequency laser, wherein the first light wave signal does not meet a Bragg condition, and the second light wave signal meets the Bragg condition.

* * * * *